July 4, 1967 J. B. PEATY 3,329,501
PHOTOGRAPHIC COLOR IMAGE FORMATION
Filed March 31, 1961
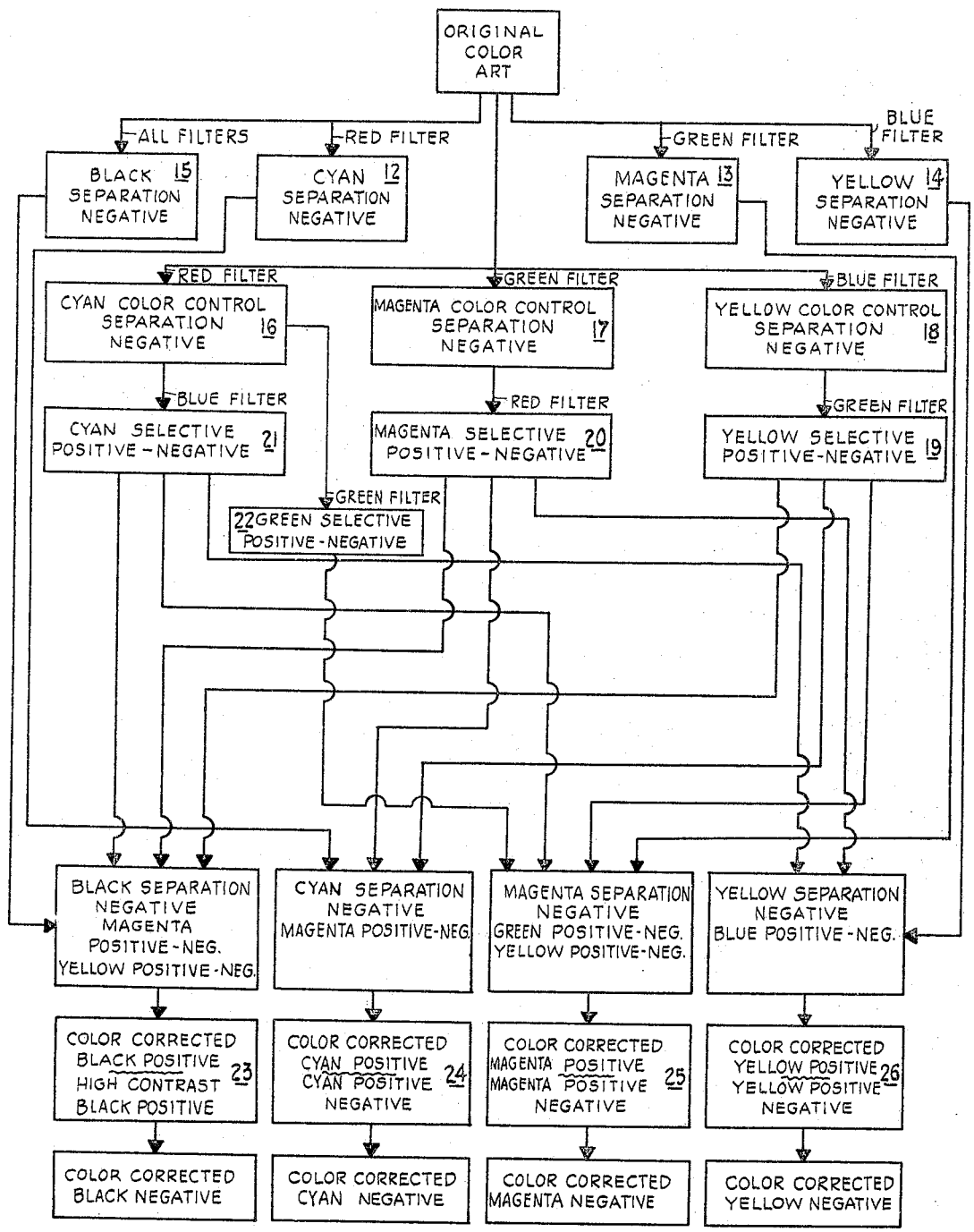

United States Patent Office 3,329,501
Patented July 4, 1967

3,329,501
PHOTOGRAPHIC COLOR IMAGE FORMATION
John B. Peaty, 312 Pulis Ave., Franklin Lakes,
N.J. 07417
Filed Mar. 31, 1961, Ser. No. 99,723
7 Claims. (Cl. 96—30)

This invention relates to a novel method of forming color images by means of a photographic process and particularly to a method for forming color-separated images suitable for reproduction by photo-engraving, lithography, offset printing, roto-gravure, color photography, and the production of color prints with the proper hue brightness and saturation.

In forming photographic color images using separate photographs for each of the primary colors many factors enter into the quality of the final product. These factors include the quality of the filters used in the camera, the lighting conditions, the photographic materials and chemicals, and the methods and materials used in developing the negatives and in printing the final reproductions. These difficulties are further aggravated in the case of photographic images processed to form half-tone, and other, printing plates or cylinders and it is the practice to employ persons of considerable artistic talent to re-etch, modify, or touch up, selected areas of the negatives, positives, and printing plates or cylinders in order to achieve a color picture of the proper quality. Some of the specific faults encountered are: feathery borders between color areas caused by the spilling over of color from one area into another area where that color should not be present, color mix-up, failure to convey the sense of three-dimensional reality, and poor color definition generally.

One of the objects of the present invention is to provide a method of obtaining better color separation prints for color lithography, offset printing, photo-engraving, roto-gravure, color photography and other forms of color image reproduction of good quality using a new process of correcting color separation positives.

Other objects and advantages of this invention will become apparent from the following description and explanation thereof.

This invention is an improvement on the standard concept of separation of light from an object to be reproduced, such as a color transparency or an opaque subject of any type, into separate black-and-white negatives and positives through the use of filtered light and the subsequent modification of these positive and negative images to prepare them for a final printing in colored inks or dyes which will result in a photographic color image giving a true representation of the color and pictorial content of the original subject matter.

The initial step in the overall process is well-known and consists of the separation of light from an object (also known as the "art") into its basic parts according to the color information of the object. The patterns of light, or images of the object, separated according to color, are recorded on panchromatic black-and-white negative material, and in the usual instance there will be four such photographic negatives: one representing the image produced by blue light, a second representing the image produced by green light, a third representing the image produced by red light, and a fourth negative representing a composite, or key, image produced by exposure of the fourth negative to selected amounts of red, green and blue light. While the resultant negatives are not colored, the four images recorded on them will nevertheless be significantly different, one from another. These images are called color separation negatives.

The second step in the overall process, and the point of departure of this invention from what has been known heretofore, involves the formation of another set of negatives called color control negatives which are similar to the separation negatives except that they are considerably underexposed and considerably overdeveloped so that the contrast between the dark portions of the color control negatives and the light portions thereof is much greater than in the case of the separation negatives.

The third step in the process involves the formation of images which are referred to as selective positive-negatives. The selective positive-negatives are formed by placing color control negatives over blank film and then exposing the film to light which has to pass through the color control negative. This results in the positive aspect of the positive-negative, for normally, exposure of blank film to light passing through a negative would merely form a positive print of the color control negative. However, instead of flooding the entire area of the color control negative evenly with light, as is customary in making a positive print from a negative, the light used in making the selective positive-negatives is an image of the subject matter filterd selectively through one or more of the three primary filters so that selected areas of the image pass through the more transparent areas of the black-and-white image on the color control negative. In the absence of the color control negative, or negatives, this light image would simply record as another negative on the blank film being exposed, which is the negative aspect of the positive-negatives. The purpose of these positive-negatives is to provide a degree of color correction not heretofore obtainable.

The selective positive-negatives, of which there is usually one for each of the primary colors involved, are then combined selectively with separation negatives of the first step to form another set of single, registered images on the emulsion of yet another set of undeveloped pieces of film. Since the light falling on the latter film passes through negatives, the images recorded after development of the film being exposed are positive images. The patterns of light and darkness of these positive images contain color information in the sense that they correspond inversely to the patterns of light and darkness of the original color separations. These positive images also contain modifying information to the extent that the selective positive-negatives change the intensity of the light reaching the unexposed film. Because of this modifying information, the positives are partially color corrected.

The last step that forms a part of the present invention, as distinct from printing steps which have been known heretofore, is the combining of each of the positives just described with the corresponding positive-negative.

The process of this invention will now be described with reference to the drawing, which is a flowsheet setting forth the steps to be followed.

The process for making the set of positives required in a four-color photo-engraving or other graphic arts process, starts with the original art 11, which may be any one of three basic objects to be depicted. These objects, or art, are: a color transparency of a size suitable for direct, contact printing; a composite color transparency of a size not suitable for contact printing but requiring, instead, to be photographed; and, finally, an opaque object, which could be either two- or three-dimensional and which also requires the use of a camera to make the necessary negatives. It is to be understood that the process about to be described will also work with two- or three-color reproduction, or even one-color reproduction, and does not require the full four colors.

In carrying out the process of the invention to make a reproduction, in color, of a large, color transparency, the separation negatives are made by placing unexposed, panchromatic black-and-white, stable base material, preferably film of the type specifically made to be used as separation negative material, including, where applicable, infra-red sensitive film for making the black separation negative, to be described hereinafter, on a suitable printing frame which may be part of an enlarger, color splitter, or the like. The color transparency is placed on the same frame, with the emulsion of the separation negative material in contact with the emulsion of the color transparency. The separation negatives can also be made on sensitized glass plates, and in order to simplify the description herein, the term "film" will be used to cover both sensitized plastic film and glass.

Light from a point source of white light is placed in front of the printing device so as to flood the surface of the transparency with an even amount of illumination and to shine through the transparency onto the separation negative film. This illumination is modified both in color and in intensity by the image on the transparency, but only variations in intensity are recorded on the emulsion of the negative. Because of the surface-to-surface contact between the emulsions, the image thus cast on the separation negative will be exactly in focus with and exactly the same size as the image on the transparency. Furthermore, due to the fact that it is customary for color transparencies to be exposed to the original scene in such a way that the emulsion of the transparency faces the scene through the lens of the camera, placing the emulsion of the transparency in contact with that of the separation negative material and shining light through from the back of the transparency means that the image, or shadow, recorded on the separation negative will be reversed left-to-right from the image on the transparency itself. This is also referred to as a lateral reversal.

In order to separate the colors recorded in the image on the transparency into primary color components, the white light from the source is further modified by filtering it with a color filter. Since the primary additive colors are red, blue, and green, the filters used in making the separation negatives usually pass light of these three respective colors, although, for various reasons, the filters may each pass a more or less broad spectrum of light instead of only one wavelength.

In making the first separation negative 12, a type A, or red, filter may be used, which will permit red light to strike the transparency. However, red light will pass through only those portions of the transparency that are transparent to it and will expose only corresponding portions of the negative material. Thus, for example, if the transparency contained an image of a red ball on green grass in front of a blue umbrella, theoretically only the red light would pass through that portion of the transparency occupied by the image of the red ball and would expose the corresponding portion of the separation negative film directly behind it. On the other hand, little or no red light would pass through that portion occupied by the green grass or the blue umbrella, and consequently, the corresponding portions of the separation negative film would receive little or no exposure. Green and blue areas would be just as impenetrable to red light as would opaque black areas. Actually, pure colors are rare, and some red light would pass through those areas occupied by images of green grass and the blue umbrella.

The other two separation negatives 13 and 14 for the other two primary colors are made in a corresponding fashion. In each case a new piece of previously unexposed separation negative film is placed in emulsion-to-emulsion contact with the transparency and the white light, modified, in the one instance, by a green filter, such as a type B filter, and in the other instance by a blue filter, such as type C5 filter, is used to flood the surface of the transparency.

For reasons which are well-known in the graphic art field, it is also common to make a fourth separation negative 15 to record black areas. This fourth negative is made by placing a piece of previously unexposed separation negative film in the same emulsion-to-emulsion contact with the transparency, but instead of exposing this combination to white light, it is common to expose the fourth negative 15 to light filtered by the same three primary color filters, one after the other. In this way, a variation in sensitivity of the separation negative material to light of the three primary colors may be taken into account. For example, if the separation negative material is more sensitive to red light than to blue light, the fourth negative 15 may be exposed longer to the blue light than to the red light.

The first separation negative 12, which was obtained by exposure to red light, is referred to as the blue, or, more accurately, cyan, separation negative for reasons which are well known in the art and which will be referred to hereinafter. Correspondingly, the separation negative 13 formed by exposure to green light is referred to as the red, or, more accurately, magenta, negative, and that formed by exposure to blue light is referred to as the yellow separation negative 14. The fourth or black separation negative 15 is also referred to in the art as the key negative.

After exposure the negatives are developed in a normal developer for a normal length of time. The result is that the latent images formed on the emulsion by the aforementioned exposures to monochromatic light become visible in the form of areas of differing degrees of opacity. To return to the example given above, in the case of an image of a red ball in the color transparency, the cyan separation negative would have a dark or even an opaque circle, while the magenta and yellow separation negatives 13 and 14 would each have a clear circle at the corresponding locations, and the black negative 15 would have a somewhat grey circle. The green grass would appear very dark on the magenta negative 13 and light on the yellow and cyan negatives 14 and 13, and the blue umbrella would appear dark on the yellow negative 14 and light on the magenta and cyan negatives 13 and 12. The image on the black negative 15 would be more or less the same sort of negative image we are accustomed to seeing in the case of an ordinary black-and-white photograph.

The second step of the process is to form a second set of negatives 16–18, called the color control negatives. The color control negatives 16–18 are formed in the same general way as the set of separation negatives 12–14 by exposing sheets of previously unexposed film to color-separated light images of the color transparency in the same printing frame. The filters that provide color separation of the light may be the same filters that were used in making the separation negatives 12–14, but normally no color control negative corresponding to the black separation negative 15 is produced. Even for four-color reproduction, only three color control negatives are required, one negative 16 containing cyan values, one negative 17 containing magenta values, and one negative 18 containing yellow values. The color control negatives 16–18 are produced in such a way as to have high contrast. This may be done by underexposure, usually by exposure to light for shorter periods of time than separation negatives on which corresponding color values are recorded, and overdevelopment usually by being treated with a stronger developing solution than that used in making the separation negatives. In addition the image formed on the emulsion of the individual color control negatives 16–18 is a left-to-right reversal of the image on the corresponding separation negatives 12–14. This is achieved by reversing the transparency in the printing frame so that, instead of having the emulsion of the transparency face upward (away from the pin-point light source) and be in surface-to-surface contact with the emulsion of the individual negatives, as was the case in the separation negatives 12–14, the emulsion of the transparency faces downward, that is, toward the light, and the emulsion of the color control negatives 16–18 is against the back of the transparency.

Considering the same color image as before: a red ball on green grass with a blue umbrella nearby, the black-and-white images on the color control negatives resemble those on the corresponding separation negatives, except that there is a greater difference between the darkest and lightest areas of a given color control negative and the same areas of a corresponding separation negative.

The third step of the process concerns the formation of films which have been identified as selective positive-negative films 19–22. Positive-negatives are made by exposing through the transparency and through certain color control negatives onto individual sheets of previously unexposed panchromatic negative film using color separated light. The purpose of the positive-negatives, 19–22, is to provide photographic color correction to the normal negatives and photographic color saturation to the color corrected positives. The selective positive-negatives 19–22 are made by using an exposure which is longer than normal, preferably between one and twelve times what would be considered a normal exposure and with an optimum value of about four times the normal exposure. After exposure the selective positive-negatives 19–22 are developed, frequently in a strong developing solution so as to be somewhat over-developed, especially where deep colors are involved.

Between one and four selective positive- negative films may be required in forming the set of films for any given color transparency. One of these selective positive-negatives 19 might be a recording of the yellow values of the final image and would be made using a green filter, for example the type B filter, and passing the light in accordance with the above-mentioned, longer, calculated exposure through the transparency and through the yellow color control negative 18. The yellow color control negative 18 is the negative that was formed by light passing through a blue type C5 filter and this color control negative will have had relatively little exposure to either red or green light and hence will be relatively transparent (or underexposed) in those areas of the image that contained only red or green colors, such as the red ball or green grass mentioned before. Light of any color could pass through these relatively transparent areas and expose the positive-negative film underneath, but the green light passing through the green filter can only pass through green areas of the transparency, not through the image of the red ball. At this point it must be reiterated that pure primary colors are seldom encountered in an image. In the illustrative example it is likely that some green light would pass through all areas of the transparency, but more would pass through green areas than through other colored areas. Thus, the selective positive-negative recording green values of the original image would be exposed very little, except in green areas of the original transparency. In the case of formation of the yellow selective positive-negative 19, green light would not only be reduced in intensity by the filtering action of blue areas, such as the blue umbrella, but would be additionally reduced by the relatively opaque grey image of the blue umbrella on the color control negative registered with the transparency.

A second selective positive-negative 20 that is commonly used records the magenta values of the final image and is made by a calculated exposure with red light passing through, for example, the type A filter and through the transparency and through the magenta color control negative 17. The latter is the negative made by exposure of light passing through the green type B filter. A third selective positive-negative 21 for recording cyan values may be made by a calculated exposure with light passing through, for example, the blue type C5 filter and through the transparency and through the cyan color control negative 16, which is the negative formed by light passing through the red type A filter. The fourth selective positive-negative 22 may be formed by a calculated exposure to light passing through the green type B filter and through the transparency and through the cyan color control negative 16 registered with transparency. This fourth selective positive-negative records the green values of the final image. It is well-known in the graphic arts field that it is not possible to produce a good color reproduction simply by making the separation negatives and then printing separation positives directly from the negative. However, this is not to say that the separation negatives are of no importance. On the contrary, the separation negatives of the basic colors must always be used, and in the case where four-color reproduction is being carried out, the magenta, cyan, yellow, and black separation negatives 23–26 are used in making positives of the respective colors.

It will simplify the description of making the positives if the use to which the positives are put is first set forth. To use a specific example, in photo-engraving, each positive is commonly printed or photographed with a half-tone screen on another film to make what is known as a half-tone negative, and each of these negatives in the set of four (for four-color reproduction) is then printed as a half-tone positive from which an individual printing plate is made. Because of the half-tone screen, the surface of the printing plate is not smooth but is divided into small dots. The gradations in tone, or darkness, of the image produced when a plate is coated with ink and then pressed against a sheet of paper are caused by corresponding gradations in the size of the dots. In areas where the image is dark the dots are relatively large but in white areas the dots are very small or even non-existent.

A full, four-color reproduction is made by printing each of the four half-tone images in sequence and in registry as possible. Present day mass production printing also requires that the sequence of printing be rapid, which frequently results in printing a second color of ink on the paper before the first color is dry. As a result, there is a tendency in this so-called wet printing process for the colors to run together, particularly where the image is dark and the dots are large and overlap. To some extent this overlapping may be removed by the well-known process of undercolor removal. It is one of the advantages of the present invention that a great deal of undercolor removal automatically takes place in carrying out the process described herein, without the necessity of providing additional undercolor removal masks.

Another very tedious process requiring great skill, and absolutely necessary in the production of most color reproductions is the process of hand-etching the printing plates to reduce or remove dots where it was desired to reduce the printing of a certain color or colors so as to make another color more prominent. This frequently has to be done to enhance the yellow portions of an image, since yellow is the brightest color and photographs light and prints light. By virtue of the present process the colors, including yellow, can be printed heavily without the handwork previously required and relying almost exclusively on the photographic steps of the method.

To return to the description of the fourth step in the method of the present invention, namely the formation of a set of positives, in making the black positive 23, the black separation negative 15 is placed on the printing frame so as to be illuminated by light from a source which usually is a small, or point source, lamp. Certain selective positive-negatives are placed in registry with the black separation negative and a piece of previously unexposed film is placed in emulsion contact with the separation negative to be exposed by light passing through the whole group of negatives just mentioned. One of the selective positive-negatives normally used in registry with the black separation negative is the magenta selective positive negative 20, which, it will be recalled, was made by exposing a sheet of film to red components of the image through a black-and-white negative made by exposing another film to green components of the image. Areas of the latter film that would be struck only by red or blue components of the image remain unexposed, and hence clear, or transparent. Thus, the red component image can pass through these relatively clear areas (as could a blue component image). This red component image exposes corresponding areas of the film in making the selective positive negative and, because of the considerable exposure (from one to twelve times normal, it will be recalled), these corresponding areas of the magenta selective positive-negative 20 will be relatively opaque. Along with the red component image thus recorded is a residual image of other colors. Similarly, the yellow selective positive-negative 19 carries a record of the yellow and green components. Stacking the magenta and yellow selective positive-negatives 20 and 19 together in registry with the black separation negative reduces all color components of the image recorded on the black positive 15, leaving only an image of the truly black or dark parts of color image. The red and yellow selective positive-negatives 20 and 19 may be removed after the black positive has been exposed for about 60% of the total time it is to be exposed. Then the film on which the black positive 23 is being made may be exposed for the remainder of the time to light passing through only the black separation negative 15.

Normally the other positives do not require the use of two selective positive-negatives, although they may. The reason that, unlike the black separation negative 15, which is exposed to all color components, the other separation negatives are exposed through only one filter.

In making the cyan positive 24, it is necessary to reduce the magenta component of the image and this is done by placing the magenta selective positive-negative 20 in registration with the cyan separation negative 12 and exposing a sheet of previously unexposed film to light passing through the selective positive-negative 20 and the cyan separation negative 12 from the point source lamp of the printing device. In addition, other negatives may be added to the group of negatives in registry and a common one to be added is a so-called hilite negative, which, as the name implies, contains a recording of only the highlights of the picture. These highlights are recorded on the hilite negative as black areas and therefore they prevent the light from reaching the corresponding areas of the film being exposed. Hilite negatives have long been used and do not form a novel part of the present invention.

The magenta positive 25 may be made by exposing another piece of previously unexposed film to light passing through the magenta separation negative 13 and through particular selective positive-negatives from the point source lamp of the printing device. In making the magenta positive 25, it is desired to have the opacity of each area correspond to the intensity of magenta color of that area in the final color reproduction, as is basically true in each of the positives. In order to do this it may be necessary to reduce the exposure of the unexposed film to light that would otherwise pass through areas which, in the final reproduction, should appear to be primarily yellow or cyan. Placing the green selective positive-negative 22 and the yellow selective positive-negative 19 in registry with the magenta separation negative 13 results in a stack of negatives that is almost opaque except in those areas that should be magenta-colored in the final image, because the yellow selective positive-negative 19 will be very dark in areas that will be largely blue in the final picture and the green selective positive-negative 22 will be nearly opaque in areas that should be cyan colored in the final picture.

The yellow positive 26 may require particular care since yellow is a very light color and will tend to print very light in the final reproduction. This means that the picture may appear to have a blue tint to it. In order to make the yellow positive 26 the cyan selective positive-negative 21 may therefore be placed in registry with the yellow separation negative 14. The cyan selective positive-negative 21 is relatively dark in those areas where the cyan color should appear in the final reproduction and by subtracting light from corresponding areas of the yellow positive 26, the yellow positive may be made much darker in those areas where the yellow color is very intense in the final picture.

After each of the four positives is exposed the exposed films are developed, preferably in a medium contrast developer and these four films then constitute positives for use in further steps in making a color reproduction such as the preparation of plates for photo-engraving, etc.

The final step, which is a part of the present invention, consists in placing in registry with each positive the corresponding positive-negative on which the same color values are recorded. That is, the yellow selective positive-negative 19 is placed in contact with the yellow positive 26, the magenta positive-negative 20 is placed in contact with the magenta positive 25, and the cyan positive-negative 21 is placed in contact with the cyan positive 24. Also, in each instance the emulsion of the selective positive-negative is placed in surface-to-surface contact with the emulsion of the positive so that there will be absolute registry between them. This means that one must be a lateral reversal of the other. The equivalent of a black selective positive-negative is a fine, black-detail positive made on contrast film from a normal black separation negative 15. It may be placed in emulsion-to-emulsion contact with the black positive 23.

The effect of placing corresponding positives and positive-negatives together is to enhance to a considerable degree the opacity of each of these registered pairs of films in the desired areas. This means that if the magenta pair is viewed against a white background, the pair of films will be much darker in certain areas than the magenta positive alone. These are areas that will appear magenta-colored in the final reproduction. The same is true of the other colors.

The foregoing description has been based upon the use of contact printing in any suitable printing device, or color splitter. The first three steps may also be carried in a camera, which makes the invention applicable to reproduction of pictorial images of three dimensional objects or transparent or opaque two dimensional objects of the same size as or a different size than the final, pictorial reproduction.

Separation negatives are made by filtering the light entering the camera and exposing separate films to each of the color component filtered images. Similarly, the color control negatives may be formed in the same way, except that it is required that they be spaced closer to the lens than the separation negatives, for they will subsequently be placed in front of the films used to make selective positive-negatives (also in the camera), and it is essential that the spacing between the lens and the color control negatives be the same when they are formed (or exposed) as when the color component image is focused through them onto the blank film in making the selective positive negatives. It is quite satisfactory if this spacing is equal to the thickness of a layer of the film used in making the selective positive-negatives.

After the first three steps have been carried out using a camera, the fourth step of making positives requires only a printing device and may be carried out as described hereinabove.

These positives may also be made using a camera, or enlarger, using similar procedure.

What is claimed is:

1. In the process of making graphic reproductions in color of an object, including exposing a first set of photographic films to individual substantially red, blue, and green primary color component optical images of said object and developing said films into a set of cyan, yellow, and magenta separation negatives, respectively, the method of: exposing a second set of photographic films to individual substantially red, blue, and green primary color component optical images of said object; developing said second set of photographic films into a set of cyan, yellow, and magenta color control negatives, respectively, of higher contrast than said separation negatives; exposing a third set of films to red, blue, and green color component optical images of said object through and in registry with said magenta, cyan, and yellow color control negatives, respectively; developing said third set of films to produce magenta, cyan and yellow selective positive-negatives; placing said magenta, cyan and yellow separation negatives, respectively, in registry with at least one of said positive-negatives of a different color designation and exposing a fourth set of films to uniform light passing therethrough and developing said fourth set of films to produce a set of color-corrected magenta, cyan and yellow positives, respectively; and placing each of said color-corrected positives in registry with the selective positive-negative of the same color designation and exposing a fifth set of films to uniform light passing therethrough and developing said fifth set of films to produce a set of color-corrected negatives.

2. The process of claim 1 in which said selective positive-negatives are exposed for a period of time at least substantially equal to normal exposure and less than approximately twelve times normal exposure.

3. The method of claim 2 in which said selective positive-negatives are exposed for approximately four times the normal length of exposure.

4. In the process of making graphic reproductions in color of an object, including exposing a first set of photographic films to individual substantially red, blue, and green primary color component optical images of said object and developing said films into a set of cyan, yellow, and magenta separation negatives, respectively, the method of: exposing a second set of photographic films to individual substantially red, blue, and green primary color component optical images of said object; developing said second set of photographic films into a set of cyan, yellow and magenta color control negatives, respectively, of higher contrast than said separation negatives; exposing a third set of films to red, blue, and green color component optical images of said object through and in registry with said magenta, cyan, and yellow color control negatives, respectively; developing said third set of films to produce magenta, cyan, and yellow selective positive negatives; placing said cyan separation negative in registry with said magenta selective positive-negative and exposing one film of a fourth set of films to uniform light passing therethrough and developing said one film to produce a color-corrected cyan positive; and placing said color-corrected cyan positive in registry with said cyan selective positive-negative and exposing one film of a fifth set of films to uniform light passing therethrough and developing said last-named film to produce a color-corrected cyan negative.

5. In the process of making graphic reproductions in color of an object, including exposing a first set of photographic films to individual substantially red, blue, and green primary color component optical images of said object and developing said films into a set of cyan, yellow, and magenta separation negatives, respectively, the method of: exposing a second set of photographic films to individual substantially red, blue, and green primary color component optical images of said object; developing said second set of photographic films into a set of cyan, yellow and magenta color control negatives, respectively, of higher contrast than said separation negatives; exposing a third set of films to red, blue, and green color component optical images of said object through and in registry with said magenta, cyan, and yellow color control negatives, respectively; developing said third set of films to produce magenta, cyan, and yellow positive-negatives, placing said magenta separation negative in registry with said yellow positive-negative and exposing one film of a fourth set of films to uniform light passing therethrough and developing said one film to produce a color-corrected magenta positive; and placing said color-corrected magenta positive in registry with said magenta positive-negative and exposing one film of a fifth set of films to uniform light passing therethrough and developing said last-named film to produce a color-corrected magenta negative.

6. In the process of making graphic reproductions in color of an object, including exposing a first set of photographic films to individual substantially red, blue, and green primary color component optical images of said object and developing said films into a set of cyan, yellow, and magenta separation negatives, respectively, the method of: exposing a second set of photographic films to individual substantially red, blue, and green primary color component optical images of said object; developing said second set of photographic films into a set of cyan, yellow and magenta color control negatives, respectively, of higher contrast than said separation negatives; exposing a third set of films to red, blue, and green color component optical images of said object through and in registry with said magenta, cyan, and yellow color control negatives, respectively; developing said third set of films to produce magenta, cyan, and yellow positive-negatives; placing said yellow separation negative in registry with said blue positive-negative and exposing one film of a fourth set of films to uniform light passing therethrough and developing said one film to produce a color-corrected yellow positive; and placing said color-corrected yellow positive in registry with said yellow positive-negative and exposing one film of a fifth set of films to uniform light passing therethrough and developing said last-named film to produce a color-corrected yellow negative.

7. In the process of making graphic reproductions in color of an object, including exposing a first set of photographic films to individual substantially red, blue, and green primary color component optical images of said object and exposing an additional film of said set to all of said primary color component optical images and developing said films into a set of cyan, yellow, magenta, and black separation negatives, respectively, the method of: exposing a second set of photographic films to individual substantially red, blue, and green primary color component optical images of said object; developing said second set of photographic films into a set of cyan, yellow and magenta color control negatives of higher contrast than said separation negatives; exposing a third set of films to red, blue, and green color component optical images of said object through and in registry with said magenta, cyan, and yellow color control negatives, respectively; developing said third set of films to produce magenta, cyan, and yellow selective positive-negatives; placing said black separation negative in registry with said magenta and yellow selective positive-negatives and exposing one film of a fourth set of films to uniform light passing therethrough and developing said one film to produce a color-corrected black positive; exposing an additional film to uniform light passing through said black separation negative and developing said additional film to produce a high-contrast black positive; and placing said color-corrected black positive in registry with said high-contrast black positive and exposing one film of a fifth set of films to uniform light passing therethrough and developing said last-named film to produce a color-corrected black negative.

References Cited

UNITED STATES PATENTS

| | | | |
|---|---|---|---|
| 2,177,195 | 10/1939 | Wilkinson | 96—30 |
| 2,971,841 | 2/1961 | Moore | 96—30 |
| 3,022,164 | 2/1962 | Weir | 96—30 |

OTHER REFERENCES

Tritton: The Photographic Journal, vol. 78, pp. 732–8 (1938) (copy in Scientific Library).

NORMAN G. TORCHIN, *Primary Examiner.*

R. A. BURROUGHS, J. T. BROWN,
*Assistant Examiners.*